No. 762,920. Patented June 21, 1904.

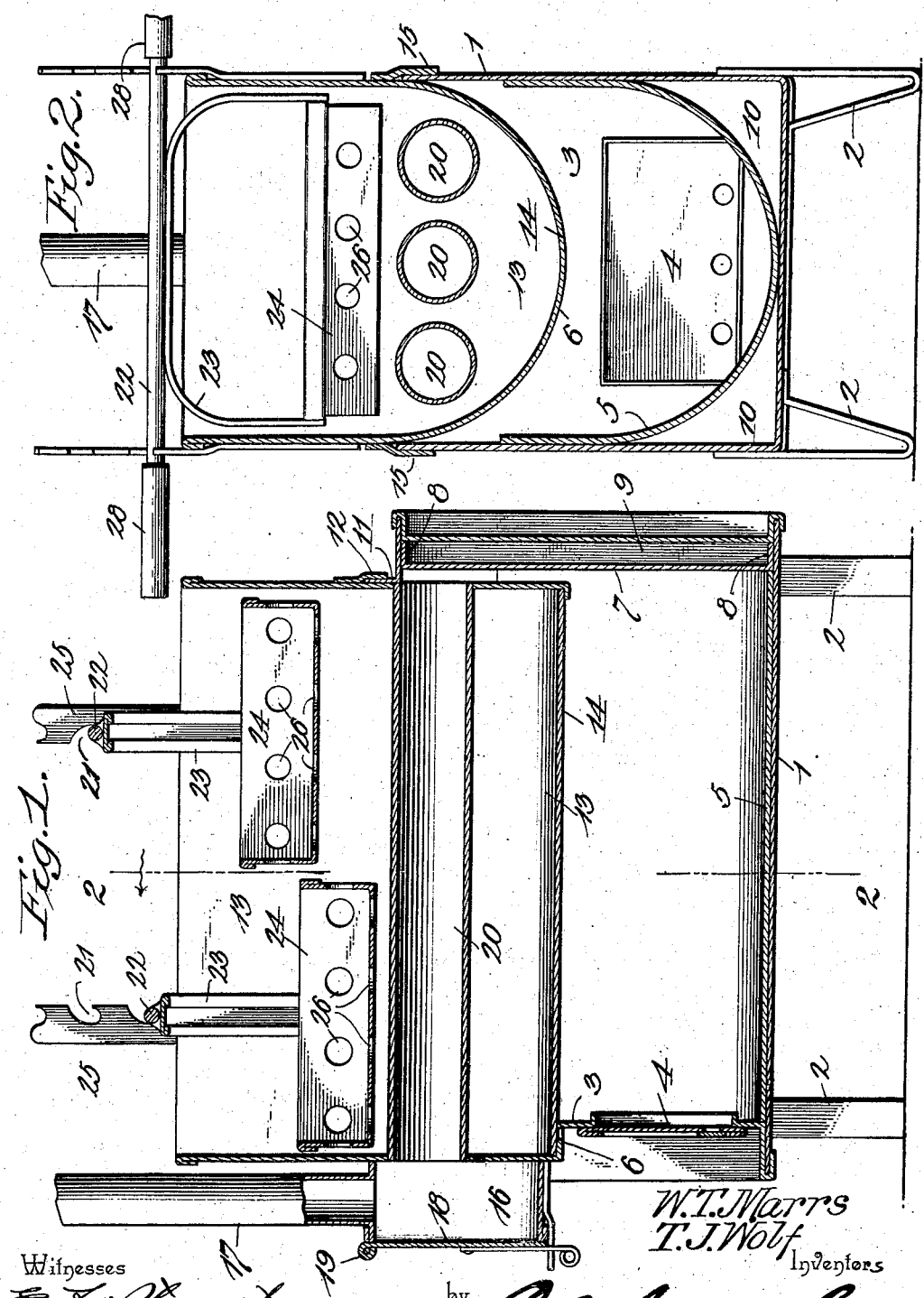

UNITED STATES PATENT OFFICE.

WILLIAM T. MARRS AND THOMAS J. WOLF, OF DE QUEEN, ARKANSAS.

AGRICULTURAL BOILER.

SPECIFICATION forming part of Letters Patent No. 762,920, dated June 21, 1904.

Application filed August 19, 1903. Serial No. 170,093. (No model.)

*To all whom it may concern:*

Be it known that we, WILLIAM T. MARRS and THOMAS J. WOLF, citizens of the United States, residing at De Queen, in the county of Sevier and State of Arkansas, have invented a new and useful Agricultural Boiler, of which the following is a specification.

This invention relates to agricultural boilers; and it has for its object to provide a device of this class which, while adapted to a variety of purposes requiring hot water, such as cooking feed for the fattening of cattle, and for other similar purposes, shall be especially adapted for the purpose of preparing and putting up fruit, vegetables, and the like.

In agricultural communities, and especially in the fruit-growing sections of the country, immense quantities of valuable fruits are annually wasted on account of the inability of the farmer to market them or to convey them in season to the canneries. A considerable proportion of such wastage might be saved if the farmer were in a position himself to can and preserve such fruits and vegetables as cannot otherwise be well disposed of. It is to provide a convenient and inexpensive apparatus through the medium of which this result may be accomplished that our invention is aimed; and it has for its object to provide a device of this class which shall possess superior advantages in point of simplicity, durability, and general efficiency.

With these and other ends in view the invention consists in the improved construction, arrangement, and combination of parts, which will be hereinafter fully described, and particularly pointed out in the appended claims.

In the accompanying drawings, Figure 1 is a longitudinal sectional view of a device constructed in accordance with the principles of our invention. Fig. 2 is a vertical transverse sectional view taken on the line 2 2 of Fig. 1.

Corresponding parts in both figures are indicated by similar characters of reference.

The casing 1, which constitutes the furnace member of our improved device, consists mainly of a rectangular box which may be constructed of sheet metal and which is supported at its corners upon legs 2, elevating it a suitable distance above the ground. The front end 3 of the box or casing is provided with a door 4, through which fuel may be fed into the combustion-chamber, which latter is provided with a lining 5, composed of a sheet of metal suitably curved, as clearly shown in Fig. 2 of the drawings. The front end 3 of the casing has a curved upper edge (designated 6) to support the front end of the tank, as will be presently described. A lining-plate 7 is disposed against the rear wall of the furnace-chamber, said lining-plate being provided with flanges 8, abutting against said rear wall, thereby forming an air-space which serves to prevent the waste of heat by radiation and which also prevents the said rear wall from burning out. The object of making the lining-plate 5 in the curved shape illustrated in Fig. 2 is likewise not only to protect the casing, but to prevent the loss of heat through radiation from the spaces 10 at the corners of the casing. The rear end of the casing is provided with an upwardly-extending flange 11, engaging a lip 12 upon the rear end of the tank, which is designated 13. Said tank, which is mainly rectangular in shape, has a semicylindrical bottom 14, the curvature of which conforms to that of the front wall 3 of the furnace-casing, upon the upper edge of which the said tank has a partial support, additional supports being provided by the lip engaging the flange 11 and by longitudinal lips 15 upon either side of the tank engaging the upper edges of the sides of the casing, as will be clearly seen in Fig. 2. The semicylindrical lower portion of the tank is provided at the front end thereof with an extension 16, forming a smoke-arch, from which a chimney or stack 17 extends upwardly, as shown, said smoke arch or chamber being provided at its front end with a door 18, hinged at its upper edge, as at 19, and through which access may be had to the flues 20, which extend longitudinally through the tank, being open at both ends of the latter. A sufficient space exists between the rear end of the tank and the rear lining of the furnace-casing to permit products of combustion from the fuel placed in the burners to ascend, pass forwardly through the flues 20, and up through the stack or exit 17. The sides of the tank are provided at their upper edges with upwardly-extending standards 25, arranged in pairs on opposite sides and provided each with a plurality of notches 21, adapted to receive transverse rods 22, connected with the bails 23 of the cap-supporting baskets 24, which latter may thus be supported by the standards 25 at various elevations within the water-tank. The baskets 24 are provided with openings 26 to permit the water to circulate freely, or they may be constructed of wire-netting or other suitable foraminous material. The rods 22 are provided at their extended ends with handles 28, by means of which they may be conveniently manipulated.

The operation and advantages of this invention will be readily understood from the foregoing description, taken in connection with the drawings hereto annexed. The tank and the furnace-casing are separable and may thus be easily transported when it is desired to move the machine, which is usually employed out of doors, from one place to another. At the same time the parts of the device are adapted to be connected conveniently and without danger of leakage of either smoke or water. The arrangement of the flues extending through the tank or water-heater increases the efficiency of the device and permits the water to be raised to boiling heat with less expense of time and fuel than would otherwise be the case. It is obvious that the device may be used in a general way as a water-heater for a variety of purposes; but when it is used for the purpose of canning fruit or vegetables, which is the primary object of the invention, the cans are disposed within the rectangular portion of the tank, being supported upon the lowermost notches of the standards 25. When the contents of the cans have been sufficiently cooked, the containing-baskets may be raised to the second notch while the air is being exhausted from the cans, and finally to the third notch, where they are supported while the vent-openings are being closed.

This device may be employed in a variety of ways, which will readily suggest themselves to those skilled in the art to which it appertains. It may also be stated that with regard to the precise structural details of the device we do not limit ourselves, but reserve the right to any changes and modifications which may be resorted to without departing from the spirit and scope of our invention or sacrificing the utility of the same.

Having thus described our invention, we claim—

1. In a device of the class described, a rectangular furnace-casing having the upper edge of its front end cut off to form a segmental recess, and provided at its rear end with an upwardly-extending flange, in combination with a tank provided with lips at its sides and rear end, said lips engaging the upper edges of the sides, and the flange at the rear end of the furnace-casing, said tank being furthermore provided with a semicylindrical bottom supported upon the upper edge of the front end of the furnace-casing.

2. In a device of the class described, a rectangular furnace-casing, a curved lining-plate engaging the bottom and sides of said casing, a flanged lining-plate abutting against the rear end of the casing and forming an air-space, a door at the front end of the casing, and a tank supported upon the casing and having a semicylindrical bottom, flues extending therethrough, a smoke-chamber at its front end and an exit-pipe rising from said smoke-chamber.

3. In a device of the class described, the combination with a furnace-casing having a vertical flange near its rear end and a recess at its front end, of a detachable tank resting at its front end in said recess and provided at its sides and rear end with lips engaging the sides of the furnace-casing and the flange at the rear end of the latter, said tank being provided with flues extending therethrough and at its front end with a smoke-chamber having a hinged door and an upwardly-extending exit-pipe.

In testimony that we claim the foregoing as our own we have hereto affixed our signatures in the presence of two witnesses.

WILLIAM T. MARRS.
THOMAS J. WOLF.

Witnesses:
OTIS T. WINGO,
J. L. TOBIN.